United States Patent [19]

Pan

[11] Patent Number: 5,706,371
[45] Date of Patent: Jan. 6, 1998

[54] OPTICAL ISOLATOR ARRAY DEVICE

[75] Inventor: Jing-Jong Pan, Milpitas, Calif.

[73] Assignee: E-Tek Dynamics, Inc., San Jose, Calif.

[21] Appl. No.: 757,699

[22] Filed: Dec. 3, 1996

[51] Int. Cl.⁶ ............................................. G02B 6/38
[52] U.S. Cl. ............... 385/11; 385/65; 385/73; 385/89
[58] Field of Search ............... 385/137, 11, 31, 385/49, 65, 73, 83, 89, 14; 372/703

[56] References Cited

U.S. PATENT DOCUMENTS

| | | | |
|---|---|---|---|
| 4,836,638 | 6/1989 | Finzel | 385/65 |
| 5,481,629 | 1/1996 | Tabuchi | 385/14 |
| 5,542,013 | 7/1996 | Kaplow et al. | 385/73 |
| 5,611,006 | 3/1997 | Tabuchi | 385/14 |

*Primary Examiner*—John Ngo
*Attorney, Agent, or Firm*—Townsend and Townsend and Crew LLP

[57] ABSTRACT

An optical isolator array is presented. The array has a substrate with parallel grooves and a groove perpendicular to the parallel grooves to separate them. First sleeves each holding an end section of a first optical fiber and a first collimating element are fixed in the parallel grooves on one side of the perpendicular groove. Second sleeves each holding an end section of a second optical fiber and a second collimating element are fixed in the parallel grooves on the other side of the perpendicular groove. An optical isolator core subassembly having first and second strips of birefringent polarizer material, and a strip of Faraday rotator material between the first and second strips of birefringent polarizer materials is fixed in the perpendicular groove. Each optical isolator is formed by a first sleeve, first collimating lens, the optical isolator core subassembly, the second collimating lens and the second sleeve in a parallel groove between a first optical fiber and a second optical fiber having end sections held respectively in the first and second sleeves.

16 Claims, 3 Drawing Sheets

FORWARD DIRECTION

REVERSE DIRECTION

OPTICAL ISOLATOR ARRAY DEVICE

BACKGROUND OF THE INVENTION

The present invention is related to the field of fiberoptic devices and, more particularly, to optical isolators for fiberoptic networks.

An optical isolator is a device which permits light signals in an optical fiber to travel in one direction and blocks light signals in the opposite direction. Such devices are useful in fiberoptic networks near the output ports of laser diodes which are light signal sources in optical fibers for the fiberoptic network, for example. Laser diodes are particularly sensitive to signal reflections, which may cause the wavelength of the diode output signal to drift and may adversely affect the power of the output signal. Optical isolators block such reflections to help "lock" the output of the laser diodes.

As the complexity of fiberoptic networks has increased, the need for optical isolators has also increased. For WDM (Wavelength Division Multiplexing) networks, in particular, the typical number of optical isolators is large. In a WDM network the wavelength of the signal is used to direct the signal from its source to its destination. In the recently proposed Dense WDM standard, the number of optical isolators is expected to rise dramatically. In a Dense WDM network the wavelength spacing between communication channels is reduced, only 0.8 nm (corresponding to a 100 GHz frequency separation), to increase the number of channels through one fiber. Hence the number of laser diode sources increases with a concomitant increase in the number of optical isolators. However, a single optical isolator is not inexpensive and the costs of optical isolators for a single WDM network can be quite high. Furthermore, the number of devices can create installation problems and raise wiring costs.

The present invention addresses these shortcomings with an optical isolator array in which a single device can provide isolation functions for several optical fibers to simplify the wiring of a fiberoptic network. The optical isolator array is miniaturized for easy installation, reliable hermetic sealing and high resistance against shock. In a WDM network in which several laser sources are clustered together, the present invention provides for simple isolation protection for the laser sources with lower costs for the optical isolator array than for a corresponding number of individual optical isolators.

SUMMARY OF THE INVENTION

The present invention provides for an optical isolator array having a substrate with a plurality of parallel grooves and a groove perpendicular to the parallel grooves to separate them. A plurality of first sleeves are each fixed in a parallel groove on one side of the perpendicular groove. Each first sleeve holds an end section of a first optical fiber and a first collimating element. A plurality of second sleeves are each fixed in a parallel groove on the other side of the perpendicular groove. Each second sleeve holds an end section of a second optical fiber and a second collimating element. An optical isolator core subassembly having first and second strips of birefringent polarizer material, and a strip of Faraday rotator material between the first and second strips of birefringent polarizer materials is fixed in the perpendicular groove. An optical isolator is formed by a first sleeve, first collimating lens, the optical isolator core subassembly, the second collimating lens and the second sleeve in a parallel groove between a first optical fiber and a second optical fiber having end sections held respectively in the first and second sleeves.

For higher performance, the optical isolator core subassembly can be formed by two stages, each stage having two strips of birefringent materials and a strip of Faraday rotator material in between.

DETAILED DESCRIPTION OF SPECIFIC EMBODIMENTS

There are various types of optical isolators which have been developed over the years. One type of optical isolator which is commonly used in fiberoptic networks is described in U.S. Pat. No. 5,208,876, entitled "Optical Isolator", which issued Nov. 1, 1991 to J. J. Pan and assigned to the present assignee. In the present invention the elements of individual optical isolators of this type are combined into a compact array of optical isolators.

Figure 1:
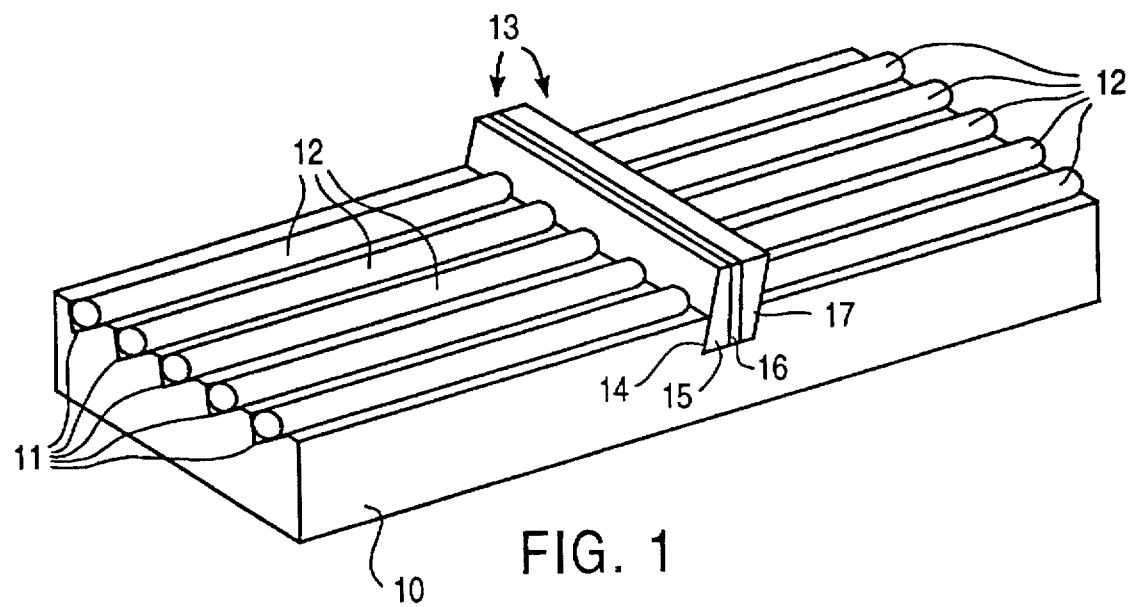
FIG. 1 is a perspective view of an optical isolator array according to one embodiment of the present invention.

FIG. 1 illustrates the overall structure of an optical isolator array according to one embodiment of the present invention. The optical isolator array has a substrate 10 with parallel grooves 11 formed on one surface of the substrate 10. These grooves extend longitudinally across the surface of the substrate 10. Each groove 11 holds a pair of sleeves 12 on either side of an optical isolator core subassembly 13. Each sleeve 12 holds ferrules 18 in which the end sections of optical fibers 25 and collimating elements (not shown in FIG. 1), which are described in greater detail below, are fixed.

Figure 2A:
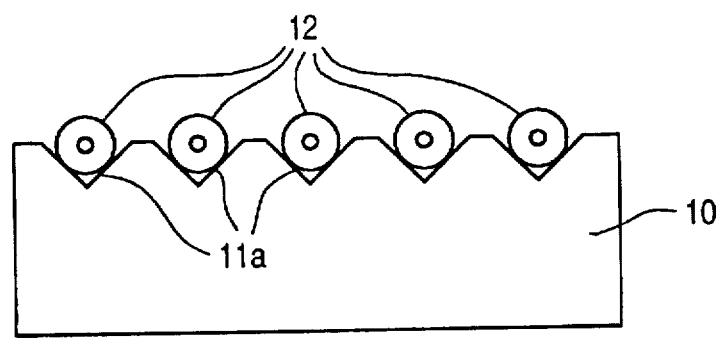
FIG. 2A is a cross-sectional view of V-grooves in the substrate of the optical isolator array of FIG. 1.
Figure 2B:
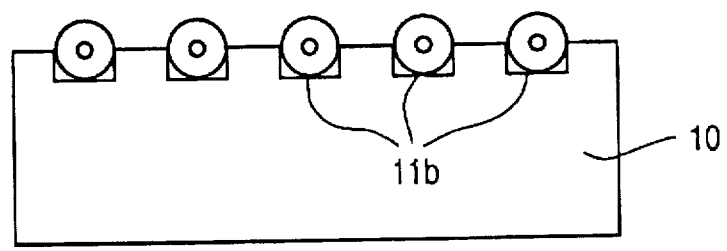
FIG. 2B is a cross-sectional view of U-grooves in the substrate of the optical isolator array of FIG. 1.

The grooves 11 may be V-shaped in cross-section as shown in FIG. 2A, or U-shaped as shown in FIG. 2B. The substrate 10 may be formed from single crystal silicon. In this case, the V-shaped grooves of FIG. 2A may be preferentially etched by techniques well-known in the semiconductor industry. Alternatively, the substrate 10 may be formed by other materials, such as glass. In either case, the grooves 11 may be formed by etching, such as processes developed in the semiconductor industry. The sleeves 12 are fixed in the grooves 11 by epoxy.

The optical isolator core subassembly 13 is likewise fixed by epoxy in a groove 14 on the surface of the substrate 10.

The groove 14 is perpendicular to the parallel grooves 11. The subassembly 13 is formed by two strips 15 and 17 of birefringent crystal materials, such as lithium niobate, rutile, calcite, yttrium orthovanadate ($YVO_4$) or lithium tantalate ($LiTaO_3$). The subassembly 13 also has a strip 16 of Faraday rotator material between the strips 15 and 17. Typical material for a Faraday rotator may be garnet doped with impurities, YIG (yttrium iron garnet), CdMnTe (cadmium manganese tellurium), CdMnTe doped with Hg, or TGG (terbium gallium garnet). The Faraday rotator strip 16 is placed in the field of a magnet (not shown in the drawings). The strip 16 can also be formed from material which does not require the influence of an external magnetic field, such as Bismuth-Substituted rare-earth iron garnets, i.e., (BiTb)$_3$(FeGa)$_5$O$_{12}$, available from the Lightwave Business Unit of AT&T Corporation of Brewingsville, Pa. 18031-9359. The birefringent strips 15, 17 and the Faraday rotator 16 stretch across the end faces of the sleeves 12 in the grooves 11.

Figure 5A:
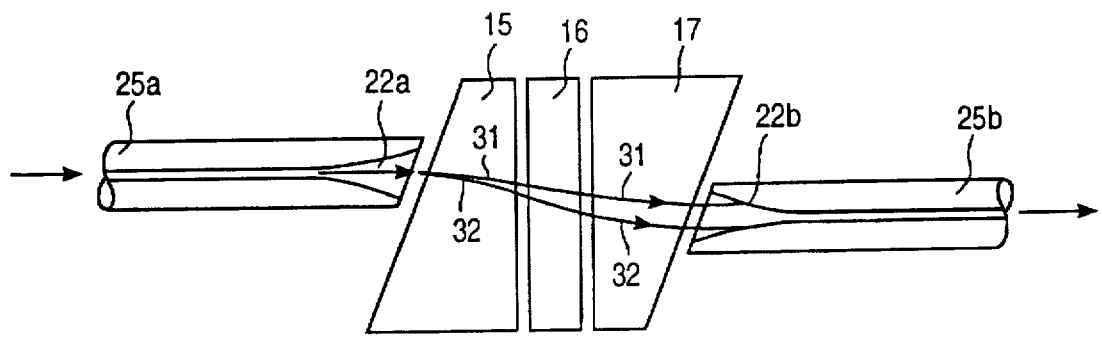
FIG. 5A illustrates the path of light signals in the forward direction through one optical isolator of the FIG. 1 array.
Figure 5B:
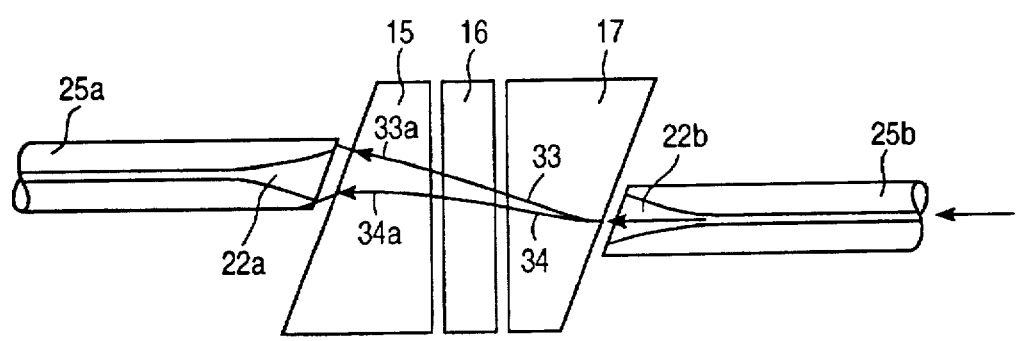
FIG. 5B illustrates the path of light signals in the reverse direction.

It should be noted that cross-sections of the birefringent crystal strips 15 and 17 are wedge-shaped and positioned to be in reciprocal relationship to each other, as illustrated in FIGS. 5A and 5B. The planar surfaces of the crystal strips 15 and 17 across the end faces of the sleeves 12 are parallel to each other, but angled from the perpendicular to the surface of the substrate 10. Hence the sides of the groove 14 in a cross-sectional view form a slanted "U", or three sides of a parallelogram, to accommodate the angled planar surfaces of the crystal strips 15 and 17.

Each sleeve 12 contains a glass ferrule 18 which has a channel 26 through the longitudinal axis of the ferrule 18. The longitudinal channel 26 holds the unjacketed end section (i.e., the core and cladding) of an optical fiber 25, which is optimally a single mode optical fiber. The end section of the optical fiber 25 is fixed by epoxy in the longitudinal channel 26. The end surface of the fiber 25 is coplanar with the end surface of the ferrule 18. This is done by cutting the end of the fiber 25 flat against the end surface of the ferrule 18 and then polishing ferrule end surface with the end of the fiber, as described in U.S. Pat. No. 5,208,876 mentioned above. The polishing step may be perpendicular to, or at a slight angle, 8°–12°, to the perpendicular of, the longitudinal axis of the ferrule 18 and fiber 25. The end surface of the ferrule 18 is angle-polished when the facing surface of the corresponding collimating element, which is described immediately below, is polished at a reciprocal angle.

Figure 3:
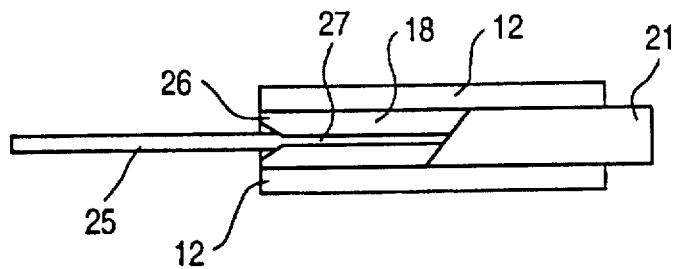
FIG. 3 is a cross-sectional view of a subassembly holding the end section of an optical fiber and a collimating lens of the FIG. 1 optical isolator array.

As shown in FIG. 3, the sleeve 12 also holds a quarter-pitch GRIN lens 21 as its collimating element. The lens 21 operates so that light signals emerging from the core of the fiber 25 are collimated after passing through the rod-shaped lens 21. Likewise, collimated light entering the GRIN lens 21 is focused at the core at the end surface of the optical fiber 25.

Figure 4A:
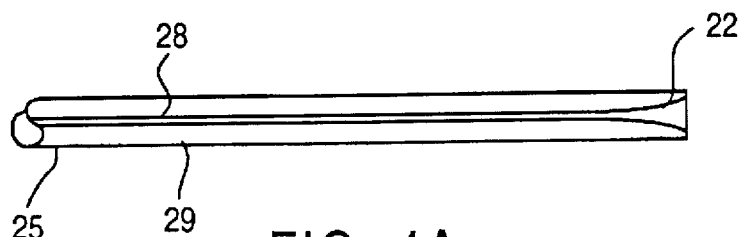
FIG. 4A is a detailed cross-sectional view of an alternative embodiment of the FIG. 3 subassembly with an expanded core as a collimating lens.
Figure 4B:
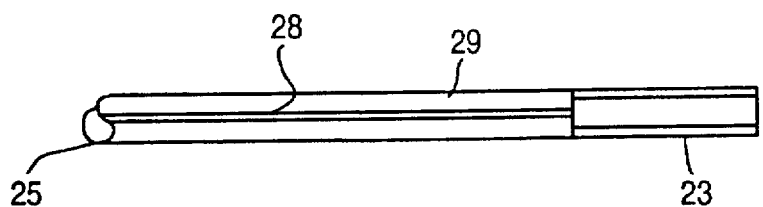
FIG. 4B is a detailed cross-sectional view of another embodiment of the FIG. 3 subassembly with a multimode fiber section as a collimating lens.
Figure 4C:
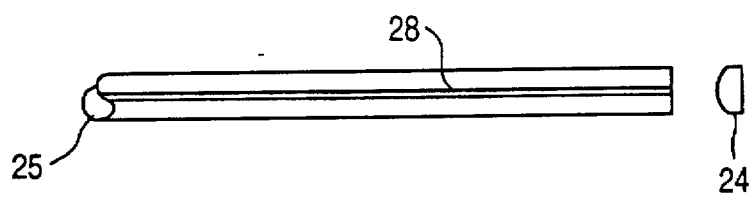
FIG. 4C is a detailed cross-sectional view of still another embodiment of the FIG. 3 subassembly with a microlens as a collimating lens.

Other elements may be used as collimating elements in the sleeves 12. In FIG. 4A, an expanded core section 22 at the end of the single mode optical fiber 25 is used as the collimating element. Optical fibers with expanded core sections may be obtained from Sumitomo Osaka Cement, Ltd. of Tokyo, Japan. FIG. 4B illustrates another collimating element in the form of a multimode optical fiber section 23. The section 23, which is long enough to form a quarter-pitch section, is placed at the end of the optical fiber 25 so that the section 23 collimates the light from the core 28 of the fiber 25 and focuses collimated light in the reverse direction into the core 28. FIG. 4C illustrates a microlens element 24 which is placed at the end of the optical fiber 25. All of these different collimating elements may be used in the optical isolator array.

The operation of an individual optical isolator in the array is illustrated in FIGS. 5A and 5B. To distinguish the forward and reverse directions through the optical isolator, the optical fibers 25 on either side of the optical isolator core subassembly 13 are labeled "25A" and "25B" to respectively indicate the input and output optical fibers. Furthermore, the collimating element in this illustration is an expanded core section. The reference numerals, "22A" and "22B", designate the expanded core sections associated with the input and output fibers respectively.

As shown in FIG. 5A, light signals from the input fiber 25A are transmitted in parallel to the first polarizer strip 15 of the isolator core subassembly 13. The birefringent crystal polarizer strip 15 has a wedge cross-section perpendicular to the direction of light travel. The polarizer strip 15 separates the incident light from the expanded core section 22A into a first component ray 31, which is polarized in the crystal's principal plane (defined by the optical axis of the polarizer 15 and the propagation direction of the light ray) and designated as the extraordinary ray, and a second ray, represented as a component ray 32, which is polarized perpendicularly to the crystal's principal plane and designated as the ordinary ray.

Separation occurs because the birefringent crystal 15 has two indexes of refraction, one for the light polarized along the optical axis, $n_e$, and another for the light polarized perpendicularly to the optical axis, $n_o$. In the example described in FIGS. 5A and 5B, the crystals 15 and 17 are assumed to be negative, i.e., $n_e - n_o < 0$. The polarizations of both rays 31 and 32 are then rotated 45° by the Faraday rotator strip 16.

The second birefringent crystal polarizer strip 17 also has a wedge cross-section in the direction of light travel. The optical axis of this second birefringent crystal is oriented 45° with respect to the optical axis of the first polarizer 15 and in the same direction as the rotation caused by the Faraday rotator 16. The polarization of the ray 31, representing the light component polarized along the extraordinary direction of the first polarizer 15, is aligned with the extraordinary direction of the second polarizer 17. Thus the same reference number is used for the ray 31 in the second polarizer 17, representing the light polarized perpendicularly to polarizer's principal plane and its propagation direction. Similarly the polarization of the ray 32, representing the light component polarized in the principal plane of the first polarizer 15, is aligned with the direction of the principal plane in the second polarizer 17. The same ray reference numeral, 32, is used in the second polarizer 17.

The net result is that after traveling from the first polarizer 15 through the second polarizer 17, the two collimated rays 31 and 32, travel displaced from, but parallel to, each other. The two rays are then combined and refocused by a second collimating element, the second expanded core section 22B, to a point on the core end of the output fiber 25B. The light ray leaving the input fiber 25A and entering the output fiber 25B are parallel, but offset from each other. The offset in FIG. 5A is greatly exaggerated for purposes of illustration. Offsets are accommodated by very fine adjustments of the sleeves 12 during installation into the grooves 11.

In the reverse direction, light from the output fiber 25B is collimated by the expanded core section 22B before being passed to the second polarizer strip 17. As shown in FIG. 5B, the light incident upon the second polarizer strip 17 is separated into two components, an ordinary ray 33 polarized perpendicularly to the principal plane of the polarizer 17, and an extraordinary ray 34 polarized along the principal plane. When passing back through the Faraday rotator 16, both rays are rotated 45°. This rotation is nonreciprocal with the rotation of light in the forward direction, i.e., rotation along the line of travel appears to be opposite in the reverse direction.

The polarization of the ray 33, representing the light component polarized perpendicularly to the principal plane in the second polarizer 17, is aligned with the direction along the principal plane of the first polarizer 15. Thus the reference numeral 33A is used for the ray 33 in the first polarizer 15 to represent the light component polarized in the principal plane of the first polarizer 15. Similarly the polarization of the ray 34, representing the light component polarized within the principal plane of the second polarizer 17, is aligned with the direction perpendicular to the principal plane in the first polarizer 15. The reference numeral 34A is used for the ray 34 in the first polarizer 15 to represent the light component polarized perpendicularly to the principal plane in the first polarizer 15. The ordinary and extraordinary rays 33 and 34 from the second polarizer 17 incident upon the first polarizer 15 have exchanged places in the first polarizer 15.

Because of this exchange, the light, having passed through the first polarizer 15, does not leave the polarizer 15 in parallel rays. The non-parallel light is focused by the collimating element, the expanded core section 22A, at points which are not located at the core end of the input fiber 25A. Thus light in the reverse direction is not passed back into the input fiber 25A and the light is blocked in the reverse direction.

The tight packing of the sleeves 12 with the optical isolator core subassembly 13 on the substrate 10 permits the optical isolator array of FIG. 1 to be inserted in a compact package having the approximate dimensions of 40 mm long×30 mm wide×10 mm high with ability to handle five optical fibers. Of course, optical isolator arrays with more, or less, individual optical isolators are possible.

Figure 6:
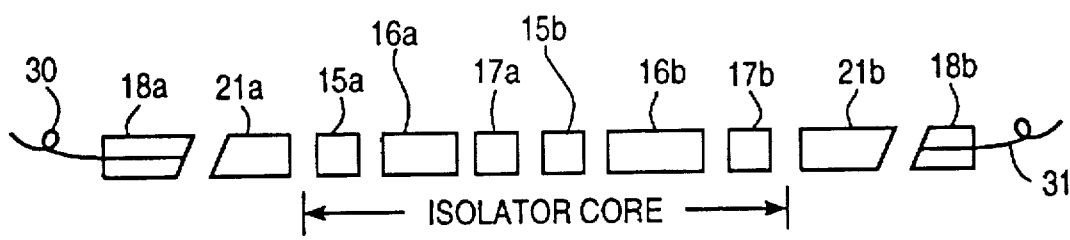
FIG. 6 is a representational block diagram of elements for a dual stage optical isolator in an optical isolator array according to another embodiment of the present invention.

To increase the performance of the optical isolator array, the isolator core subassembly may be implemented with dual stages as represented in FIG. 6. The first stage is formed by birefringent polarizing strips 15A and 17A on either side of a Faraday rotator 16A. The second stage of the isolator core subassembly is formed by birefringent polarizing strips 15B and 17B on either side of a Faraday rotator strip 16B. Such dual stage optical isolator structures have a much higher isolation performance with just a slight increase in insertion loss, compared to single stage optical isolators. For example, in individual dual stage optical isolators of the type described, isolation of better than 60 dB have been achieved. Furthermore, by arranging the optical axes of the stages of the optical isolator subassembly, polarization mode dispersion can be effectively eliminated or substantially reduced.

From the description above, it should be apparent that the isolation action of each stage of the dual stage optical isolator of FIG. 6 is independent of the polarization of the light signal in the fibers 30 and 31. That is, each stage operates as an isolator independently of the relationship of the orientation of the optical axes of the birefringent polarizers with respect the polarization of the light travelling through each stage and of the relationship of the orientation of the optical axes of the birefringent polarizers in the two stages.

However, the path of split light rays due to the action of the birefringent polarizers through the optical isolator core subassembly may have two different optical distances. Therefore, even though the light signals are recombined later by the second collimating element, the combined signal now has one mode of polarization ahead of, or behind, the other mode. There is a time delay between the two polarization modes and the signal has become dispersed. As the signal travels through an optical fiber over long distances, the dispersion effect is increased. Furthermore, numerous optical repeaters with isolators in the fiber optical network further compound the problem.

As described in U.S. appln. Ser. No. 08/354,706, now U.S. Pat. No. 5,566,259 entitled, "A DUAL STAGE OPTICAL DEVICE WITH LOW POLARIZATION MODE DISPERSION", filed Dec. 7, 1994, by J. J. Pan et al. and assigned to the present assignee, the birefringent polarizers of the isolator stages are arranged so that each polarization mode of the light signal travels the same optical distance through the isolator core subassembly. Each light component travels the same optical distance no matter how the component's polarization is aligned with the optical axes of the birefringent polarizers. The optical axes of the birefringent polarizers of each stage maintain the same orientation with respect to each other so that the optical isolation function of each stage is preserved. However, the orientation of the optical axes of the birefringent polarizers of each stage with respect to the other stage is arranged so that a polarization mode along one direction, say, the ordinary direction, of a light ray in the first stage is aligned along the opposite, extraordinary, direction in the second stage. The light component of polarization along the extraordinary direction in the first stage is aligned along the ordinary direction in the second stage. In this manner, light in any polarization state always travels the same optical distance through the isolator.

Furthermore, the Faraday rotators 16A and 16B of each stage are arranged to rotate the linear polarization of light in a particular direction by the same amount, but in opposite directions. This preserves the state of polarization of the light from the input fiber to the output fiber and may be important if an optical device downstream of the isolator is dependent upon the state of polarization of the light. It should be noted that most of the single stage isolators of the type described rotate linearly polarized light by 45°.

More details of the operation of dual stage optical isolators is found in the above referenced U.S. appln. Ser. No. 08/354,706, now U.S. Pat. No. 5,566,259 which is incorporated by reference herein.

While the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

What is claimed is:

1. An optical isolator array comprising
   a substrate having a plurality of parallel grooves on a surface of said substrate, and a groove across and perpendicular to said parallel grooves;
   a plurality of first sleeves, each first sleeve holding end sections of first optical fibers and a first collimating element proximate said perpendicular groove, said first sleeve fixed in a parallel groove on a first side of said perpendicular groove;
   a plurality of second sleeves, each second sleeve holding end sections of second optical fibers and a second collimating element proximate said perpendicular groove, said second sleeve fixed in a parallel groove on a second side of said perpendicular groove; and
   an optical isolator core having first and second strips of birefringent polarizer material, a strip of Faraday rotator material between said first and second strips of birefringent polarizer materials, said optical isolator core fixed in said perpendicular groove so that an optical isolator is formed by a first sleeve, first collimating lens, said optical isolator core, said second collimating lens and said second sleeve in a parallel groove between a first optical fiber and a second optical fiber having end sections held respectively in said first and second sleeves.

2. The optical isolator array of claim 1 wherein said first and second optical fibers comprise single mode optical fibers.

3. The optical isolator array of claim 1 wherein at least one of said polarizers comprises lithium niobate, calcite, rutile, yttrium orthovanadate or lithium tantalate.

4. The optical isolator array of claim 1 wherein at least one of said Faraday rotators comprises garnet doped with impurities, yttrium iron garnet, cadmium manganese tellurium, CdMnTe doped with Hg, or terbium gallium garnet.

5. The optical isolator array of claim 1 wherein said perpendicular groove extends completely across said substrate.

6. The optical isolator array of claim 5 wherein said perpendicular groove has a slanted U-shaped cross-section.

7. The optical isolator array of claim 1 wherein said substrate comprises single crystal silicon.

8. The optical isolator array of claim 1 wherein said substrate comprises glass.

9. The optical isolator array of claim 1 wherein said first and second collimating elements comprise quarter-pitch GRIN lenses.

10. The optical isolator array of claim 1 wherein said first and second collimating elements comprise expanded tapered core optical fiber sections.

11. The optical isolator array of claim 1 wherein said first and second collimating elements comprise quarter-pitch multimode optical fiber sections.

12. The optical isolator array of claim 1 wherein said first and second collimating elements comprise a plurality of microlenses.

13. The optical isolator array of claim 1 wherein said parallel grooves have a V-shaped cross-section.

14. The optical isolator array of claim 1 wherein said parallel grooves have a U-shaped cross-section.

15. The optical isolator array of claim 1 further comprising
a third polarizer, a second optical Faraday rotator, and a fourth polarizer between said second and said second GRIN lens, wherein said third and fourth polarizers comprise birefringent crystals of lithium niobate.

16. The optical isolator array of claim 15 wherein said third polarizer, second Faraday rotator and fourth polarizer are rotationally arranged with respect to said first polarizer, first Faraday rotator and second polarizer so that polarization mode dispersion through each optical isolator is minimized.

* * * * *